March 3, 1970   J. L. DANIELL   3,498,101
CAULKING TOOL
Filed Oct. 2, 1967

INVENTOR.
JOHN L. DANIELL
BY Newton, Hopkins,
Jones & Ormsby
ATTORNEYS

United States Patent Office 3,498,101
Patented Mar. 3, 1970

3,498,101
CAULKING TOOL
John L. Daniell, 1111 Six Flags Drive,
Austell, Ga. 30001
Filed Oct. 2, 1967, Ser. No. 672,097
Int. Cl. B21j 19/00
U.S. Cl. 72—479    10 Claims

ABSTRACT OF THE DISCLOSURE

A caulking tool for use in caulking bell and spigot type pipe joints which includes an annulus which encircles the spigot portion of the joint, the annulus being formed of two semicircular segments pivoted together to facilitate placement of the tool about the spigot portion of the pipe joint, an axially oriented inner resilient caulking flange respectively depending from each of the semicircular segments and which have their extending edges beveled to cause the inner caulking flanges to be urged toward the spigot portion of the pipe joint when the joint is being caulked, and an axially oriented outer resilient caulking flange depending respectively from the semicircular segments outwardly of and concentrically of the inner caulking flanges and having their extending edges beveled to cause the outer caulking flanges to be urged outwardly toward the bell portion of the pipe joint as the joint is being caulked.

BACKGROUND OF INVENTION

Field of invention

This invention relates generally to caulking tools and more praticularly to a caulking tool which simultaneously compacts or caulks the inner portion and the outer portion of the packing in a bell and spigot type pipe joint.

Description of the prior art

Caulking tools utilized in the plumbing trade to caulk pipe joints of the bell and spigot type are well known in the prior art. The most commonly known type of caulking tool in the trade is the type which has a single tool flange much narrower than the distance around the joint to be caulked and an offset handle portion provided with a driving end thereon to be struck by a hammer and compact the joint. Usually, the joint is packed by striking the tool in one position, moving the tool to a new position and striking the end of the handle again to compact that portion and repeating this operation until the joint is completely caulked.

One of the problems associated with such caulking tools is the fact that the process of completely caulking the joint is very time consuming due to the many times that the tool has to be moved. Another problem involved with this type of caulking tool is that it is extremely difficult to caulk the entire width of the joint between the spigot and bell portion of the joint due to the problem of adequately positioning the tool since the tool is generally thinner than the space provided between the spigot and bell portion of the joint.

The prior art has attempted to caulk the entire width of the joint by providing adjacent pivotal members with lower beveled edges which force one portion outwardly against the bell portion of the pipe joint and the other portion inwardly against the spigot portion of the pipe joint to caulk the joint. One of the problems with this type of caulking tool is that it also must be moved many times to completely caulk the pipe joint. Since the two portions of the caulking tool are offset, the portions of the joint caulked at one time will be offset so that the entire width of the packing is not caulked simultaneously which causes improper sealing of the joint as well as breakage of the lead filler usually utilized to cover the packing in the joint.

SUMMARY OF INVENTION

The invention disclosed herein overcomes these and other problems associated with prior art caulking tools by providing a means whereby the entire width of the packing between the bell and the spigot portions of the pipe joint is caulked simultaneously as the top of the caulking tool is struck with a hammer. It will also be seen that the time required for caulking the joint is greatly reduced by providing the annular member which completely encircles the spigot portion of the pipe joint does not need to be moved during the caulking operation.

The apparatus of the invention comprises generally an annulus formed of a pair of semicircular segments pivotally connected so that the annulus can be placed around the spigot portion of the pipe joint. A resilient axially oriented caulking flange depends respectively from each semicircular segment to form a continuation of the annulus and fits into the pipe joint, and a resilient axially oriented caulking flange depends respectively from each semicircular segment concentrically of the respective inner caulking flange and fits within the pipe joint so that when the top of the annulus is struck with a hammer or any other conventional means, the inner and outer caulking flanges will compact or caulk the entire width of the packing of the pipe joint. To insure that the entire width of the packing of the pipe joint is caulked, the inner flanges have a beveled extending edge which causes the inner flanges to be deflected toward the spigot portion of the pipe joint and the outer flanges have a beveled edge so that the outer flanges are forced toward the bell portion of the pipe joint as the annulus is struck. Since both the inner and outer flanges are constructed of resilient material, this causes the entire width of the packing between the spigot and bell portions of the pipe joint to be compressed simultaneously when the top of the caulking tool is struck with a hammer or other known means.

These and other features of the invention will be more clearly understood upon consideration of the following detailed description and accompanying drawings wherein like characters of reference designate corresponding parts throughout and in which:

The figures and the following detailed description disclose a specific embodiment of the invention, however, the inventive concept is not limited thereto since it may be embodied in other equivalent forms.

DESCRIPTION OF ILLUSTRATIVE EMBODIMENTS

Figure 1:
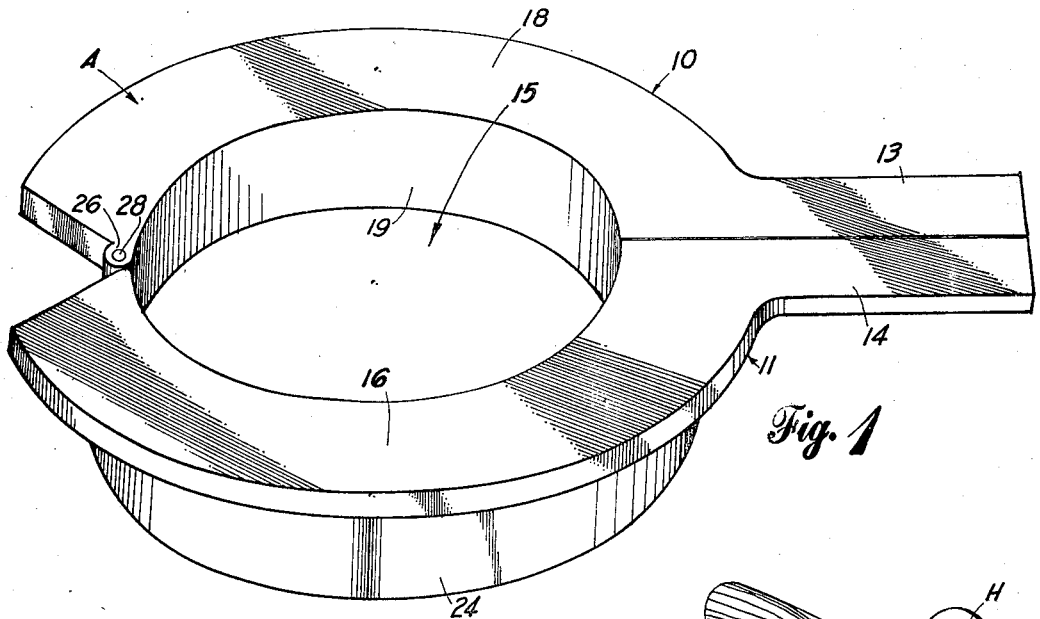
FIGURE 1 is a perspective view of one embodiment of the invention.
Figures 2, 3:
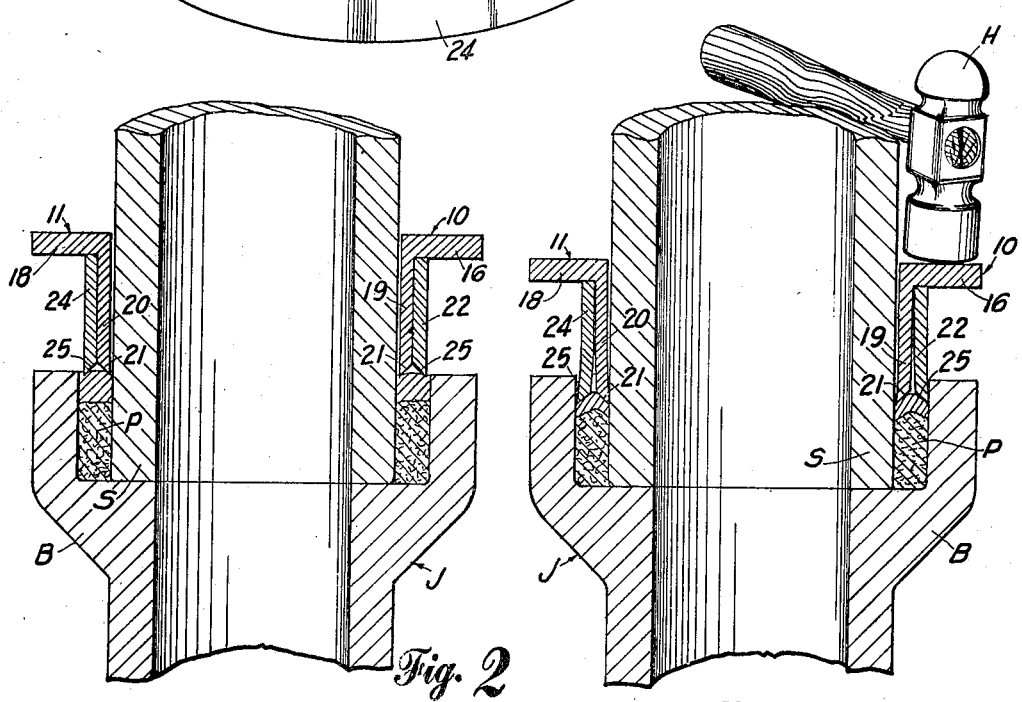
FIGURE 2 is a cross-sectional view taken along the lines 2—2 in FIGURE 1 showing the invention being utilized to compact a conventional pipe joint of the bell and spigot design.
FIGURE 3 is a cross-sectional view as seen in FIGURE 2 with the flanges expanded as when the caulking operation is being performed.
Figure 4:
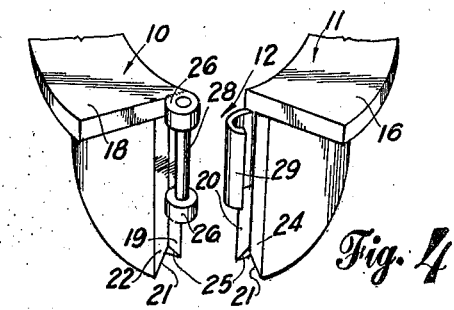
FIGURE 4 is a partial perspective view showing the pivotal connection between the semicircular portions of the invention.

Referring to the figures, it will be seen that the device embodying the invention includes an annulus A formed by a first semicircular segment 10 and a second semicircular segment 11, the second semicircular segment 11 being a mirror image of the segment 10. The segments 10 and 11 are joined at one of their ends through a pivotal connection 12 and are provided with complementary handle portions 13 and 14 at their other ends by which the annulus A can be manipulated. When the segments 10 and 11 are pivotally joined through the connection 12 and moved toward each other to an abutting condition, as is shown in FIG. 1, a central opening 15 through the annulus A is provided which is just sufficiently large to fit around the spigot portion S of a bell and spigot type pipe joint J. The segment 10 has a radially projecting arcuate driving flange 16 along its upper edge and the segment 11 has a like flange 18 along its upper edge. Driving flanges 16 and 18 are struck by a driving means such as a hammer H as is shown in FIG. 3 during a caulking operation.

An arcuate axially extending caulking flange 19 depends from the inner edge of the segment 10 and a like caulking flange 20 depends from the segment 11. When the segments 10 and 11 are in abutting position the caulking flanges 19 and 20 define a continuation of the opening 15. The caulking flanges 19 and 20 are so arranged that the spigot portion S of the pipe joint J is encircled thereby and are slidable therealong to permit caulking of the joint J. The lower edges of the flanges 19 and 20 are each beveled and slope upwardly from the lower inside surface to the outside surface thereof to define a beveled surface 21 which engages the packing P in the pipe joint J. The caulking flanges 19 and 20 are constructed of a resilient material so that when the driving flanges 16 and 18 are struck, the beveled surface 21 will force the flanges 19 and 20 closely around the spigot portion S of the pipe joint J to engage and compact the packing P which is adjacent the spigot portion S of the pipe joint J.

Also connected to the semicircular segment 10 just outwardly and concentrically of the caulking flange 19 is an outer, axially oriented, arcuate caulking flange 22, and connected to the segment 11 in like manner is a similar outer arcuate caulking flange 24. Like flanges 19 and 20, the lower edge of each of the flanges 22 and 24 is provided with a beveled surface 25, which slopes from the lower outside surface upwardly to the inner surfaces so that an inverted V is defined by the beveled surfaces 21 and 25. The combined thickness of the flanges 19 and 22 and the flanges 20 and 24 are such that they will fit into the cavity C defined by the conventional spigot and bell type pipe joint J. The outer caulking flanges 22 and 24 are also constructed of a resilient material so that the beveled surfaces 25 are effective to force the flanges 22 and 24 outwardly against the bell portion B of the pipe joint J to insure compaction of the packing P adjacent the bell portion B. Therefore, it will be seen as the driving flanges 16 and 18 are struck with a hammer H, the flanges 19 and 22, and the flanges 20 and 24 will engage the material adjacent the edges of the bell portion B and the spigot portion S of the pipe joint J and will compact the entire width of the packing P in the pipe joint J.

To facilitate in the use of the device, the pivotal connection 12 is of a break apart design which consists of a pair of spaced connectors 26 carried by the semicircular segment 10 and having a connecting rod 28 extending therebetween. The semicircular segment 11 has an appropriately engaging lug 29 which can be slipped into position around the connecting rod 28 when the handle portions 14 are spread apart and will maintain a pivotal connection between the segments 10 and 11 as the handle portions 14 are moved toward each other in conventional manner. This greatly facilitates the mounting of the caulking tool at the pipe joint J when little space is available for positioning the segments 10 and 11 around the pipe.

The caulking tool, as seen in the drawings, includes the two opposed concentric generally semi-circular segments 10 and 11 which have first and second ends abutting each other when the segments 10 and 11 are in their closed position so as to define an annulus. The pivot pin or connecting rod 28 is parallel to the axis of this annulus and joins the first ends together so that the segments 10 and 11 may pivot with respect to each other in a common radial plane, from a closed position, as illustrated in FIG. 1 in which the handles 13 and 14 lie in a common radial plane with their inner edges abutting each other to an open position. It will be observed in FIG. 1 that the flanges 16 and 18 protrude in opposite directions from the upper edges of the segments 10 and 11, the flanges 16 and 18 lying in a common radial or transverse plane with the handles 13 and 14. The edges of the flanges 16 and 18, adjacent the pin 28, converge toward the pin and, therefore, limit the opening of one segment 10 with respect to the other segment 11. It will also be observed that the handles 13 and 14 are in juxtaposition parallel to each other when the segments 10 and 11 are in their closed position.

While the segments 10 and 11 are made up of two flanges 19 and 22 and 20 and 24, respectively, these flanges, as well as the segments themselves, are concentric with each other, the lower edges of the segments terminating in a common transverse radial plane parallel to and spaced below the plane of the flanges 16 and 18. In FIG. 3 it is seen that the segments 10 and 11, i.e., flanges 19 and 22 and flanges 20 and 24, are thin cylindrical members which have a thickness less than the distance between the inside annular surface of spigot B and the outside peripheral surface of pipe S. Therefore, the body of segments 10 and 11 will fit therebetween so that the lower edge extremities are spaced apart and the beveled edges 21 and 25 converge upwardly toward the central portion of the segments 10 and 11.

It will be obvious to those skilled in the art that many variations may be made in the embodiments chosen for the purpose of illustrating the present invention without departing from the scope thereof as defined by the appended claims.

What is claimed as invention is:

1. A tool for caulking pipe joints of the bell and spigot design comprising:
   an annulus comprising a curvilinear segment and a second curvilinear segment for slidably encircling the spigot portion of the pipe joint when said first segment and said second segment are in an abutting condition;
   a first curvilinear inner caulking flange depending from the inside edge of said first segment;
   a second curvilinear inner caulking flange depending from the inside edge of said second segment, said first and second caulking flanges being extendable into the space between the bell and spigot portions of the pipe joint when said first and second segments are in abutting condition, and said first and second caulking flanges having means on the depending edges thereof for forcing said first and second caulking flanges toward the spigot portion of the pipe joint during the caulking of the pipe joint;
   a first curvilinear outer caulking flange depending from said first segment concentrically of said first inner caulking flange and just outwardly thereof; and
   a second curvilinear outer caulking flange depending from said second segment concentrically of said second inner caulking flange and just outwardly thereof, said first and second outer caulking flanges being extendable into the space between the bell and spigot portions of the pipe joint when said first and second segments are in abutting position, and said first and second outer caulking flanges having means on the depending edge thereof for forcing said first and second outer flanges toward the bell portion of the pipe joint during the caulking of the pipe joint.

2. A tool for caulking pipe joints as set forth in claim 1 wherein said first and second outer caulking flanges are resilient.

3. A tool for caulking pipe joints as set forth in claim 1 wherein said first and second inner caulking flanges and said first and second outer caulking flanges are resilient.

4. A tool for caulking pipe joints as set forth in claim 3 wherein said means for forcing said first and second outer caulking flanges toward the bell portion of the pipe joint includes a beveled surface.

5. A tool for caulking pipe joints as set forth in claim 4 wherein said means for forcing said first and second inner caulking flanges toward the spigot portion of the pipe joint includes a beveled surface.

6. A tool for caulking pipe joints as set forth in claim 5 further including pivot means connecting said first and second segments of said annulus.

7. A tool for caulking pipe joints as set forth in claim 6 wherein said pivot means includes releasable means for separating said segments of said annulus.

8. A tool for caulking the packing in pipe joints of the bell and spigot design including:
   support means;
   a first annular caulking flange fixedly depending from said support means;
   a second annular resilient caulking flange fixedly depending from said support means adjacent said first caulking flange and in juxtaposition therewith; and
   deflection means constructed and arranged to separate the lower depending edges of said first and second caulking flanges for compacting the full width of the packing in the pipe joint during the caulking operation.

9. A tool for caulking the packing in pipe joints as set forth in claim 8 wherein said first caulking flange is resilient.

10. A tool for caulking the packing in pipe joints as set forth in claim 9 wherein said deflection means includes a bevel surface on the depending edge of said first and second caulking flanges.

References Cited

UNITED STATES PATENTS

| 1,165,041 | 12/1915 | Toom | 81—8.1 X |
| 3,079,816 | 3/1963 | Lindley | 81—8.1 X |

ROBERT C. RIORDON, Primary Examiner

R. V. PARKER, Jr., Assistant Examiner

U.S. Cl. X.R.

81—8.1